(12) United States Patent
Reynolds et al.

(10) Patent No.: US 12,401,923 B2
(45) Date of Patent: Aug. 26, 2025

(54) IMAGE SENSOR AND PROCESSES OF IMPLEMENTING AN IMAGE SENSOR

(71) Applicant: NORDSON CORPORATION, Westlake, OH (US)

(72) Inventors: Grahame Reynolds, Southampton (GB); Harald Weller, Southampton (GB); Timothy Edwards, Southampton (GB)

(73) Assignee: Nordson Corporation, Westlake, OH (US)

( * ) Notice: Subject to any disclaimer, the term of this patent is extended or adjusted under 35 U.S.C. 154(b) by 53 days.

(21) Appl. No.: 18/257,197

(22) PCT Filed: Jan. 27, 2022

(86) PCT No.: PCT/US2022/014040
§ 371 (c)(1),
(2) Date: Jun. 13, 2023

(87) PCT Pub. No.: WO2022/164991
PCT Pub. Date: Aug. 4, 2022

(65) Prior Publication Data
US 2024/0048867 A1 Feb. 8, 2024

Related U.S. Application Data

(60) Provisional application No. 63/142,013, filed on Jan. 27, 2021.

(51) Int. Cl.
*H04N 25/77* (2023.01)
*H04N 25/30* (2023.01)
*H04N 25/585* (2023.01)
*H04N 25/59* (2023.01)
*H04N 25/703* (2023.01)

(52) U.S. Cl.
CPC .......... *H04N 25/77* (2023.01); *H04N 25/703* (2023.01); *H04N 25/30* (2023.01)

(58) Field of Classification Search
CPC ...... H04N 25/77; H04N 25/703; H04N 25/59; H04N 25/585; H04N 25/30
See application file for complete search history.

(56) References Cited

U.S. PATENT DOCUMENTS

| 7,408,577 | B2* | 8/2008 | Nakamura | H04N 25/77 348/308 |
| 2007/0013797 | A1* | 1/2007 | McKee | H04N 25/771 348/308 |
| 2012/0153123 | A1* | 6/2012 | Mao | H04N 25/771 250/208.1 |
| 2013/0033631 | A1 | 2/2013 | Mabuchi | |
| 2015/0281666 | A1* | 10/2015 | Chen | H04N 25/61 348/302 |

(Continued)

FOREIGN PATENT DOCUMENTS

CN 102142449 A 8/2011

*Primary Examiner* — Marly S Camargo
(74) *Attorney, Agent, or Firm* — BakerHostetler

(57) ABSTRACT

An image sensor includes a pixel array that includes pixel array circuitry; and a read path that includes read path circuitry. The image sensor includes one or more of a capacitive element and a capacitive enable circuit, a temperature sensor, a number of pixel types, and/or selectable pixel characteristics.

33 Claims, 3 Drawing Sheets

(56) References Cited

U.S. PATENT DOCUMENTS

| | | |
|---|---|---|
| 2017/0048471 A1 | 2/2017 | Anaxagoras |
| 2017/0339327 A1* | 11/2017 | Koshkin ................ H04N 23/73 |
| 2018/0191974 A1 | 7/2018 | Shim |
| 2020/0065572 A1* | 2/2020 | Roberts ................ H04N 25/75 |
| 2024/0304647 A1* | 9/2024 | Cowley ................ H04N 25/78 |

* cited by examiner

IMAGE SENSOR AND PROCESSES OF IMPLEMENTING AN IMAGE SENSOR

CROSS REFERENCE TO PRIOR APPLICATIONS

This application is a National Stage Application of International Patent App. No. PCT/US2022/014040, filed Jan. 27, 2022, which claims the benefit of U.S. Provisional Application No. 63/142,013 filed on Jan. 27, 2021, the entire disclosures of both of which are hereby incorporated by reference as if set forth in their entirety herein.

FIELD OF THE DISCLOSURE

The disclosure relates to an image sensor. The disclosure further relates to processes of implementing an image sensor.

BACKGROUND OF THE DISCLOSURE

Typical image sensors have limited capabilities resulting in less than optimal performance. For example, typical image sensors and x-ray sensors have one or more additional capacitive elements available in each pixel. A global control typically allows one or more of these capacitors to be connected to a corresponding photodiode charge collection node in order to provide additional charge collection capacity, reducing the conversion gain of the pixel. This increases the maximum charge collection capacity, also known as full well capacity of all the pixels in the image sensor, but the lower conversion gain means that small signal levels may be below the noise floor of the sensor.

The tradeoff between higher maximum full well capacity and low noise performance is not always desirable. In many cases, it is desirable to have both, giving a wider dynamic range which is defined as the ratio of maximum full well capacity to noise floor. If an image sensor is configured for high full well capacity, then the dark areas of an image may be obscured by noise.

On the other hand, some sensors read each pixel multiple times, once per pixel capacitance and/or pixel gain at different integration times. This wastes photons in dark areas of the image during the high capacitance/low-gain period, where the image brightness is below the noise floor.

Additionally, image sensors can be used to detect high energy photons via the energy they deposit in the silicon of the image sensor. This makes image sensors useful for dosimetry. For example, image sensors implemented in a head of a medical linear accelerator (LINAC). However, high energy photons travelling through air and other material also generate electrons, which also generate a signal in the image sensor. This interferes with the signal generated by the photons, making the measurement of the number of photons uncertain.

Accordingly, what is needed is an image sensor having improved sensing capabilities and/or increased sensing performance addressing the issues noted herein.

SUMMARY OF THE DISCLOSURE

One aspect includes an image sensor that includes: a pixel array includes pixel array circuitry; a read path includes read path circuitry; and a capacitive element and a capacitive enable circuit configured to enable the capacitive element to vary a capacitance provided to a pixel of the pixel array, where the pixel array is configured to selectively implement the capacitive element and the capacitive element enable circuit in different pixels and/or different areas of the pixel array.

One aspect includes an image sensor that includes: a pixel array includes pixel array circuitry; a read path includes read path circuitry; and a temperature sensor.

One aspect includes an image sensor that includes: a pixel array includes pixel array circuitry; and a read path includes read path circuitry, where the pixel array includes a number of pixel types includes at least one of the following pixel types: higher sensitivity to electrons pixel types, pixel types implementing electrical shielding, pixel types implementing different ratios of electron and photon sensitivities, and/or pixel types having reduced sensitivity to electrons.

One aspect includes an image sensor that includes: a pixel array includes pixel array circuitry; a read path includes read path circuitry; and where the pixel array includes a number of selectable pixel characteristics.

One aspect includes an image sensor that includes: a pixel array includes pixel array circuitry; a read path includes read path circuitry; an analog to digital converter (ADC) includes analog to digital converter (ADC) circuitry; and a capacitive element and one or more capacitive enable circuits configured to enable one or more of the capacitive elements to vary the capacitance provided to a selection of pixels of the pixel array.

One aspect includes an image sensor that includes: a pixel array includes pixel array circuitry; a read path includes read path circuitry; an analog to digital converter (ADC) includes analog to digital converter (ADC) circuitry; and one or more temperature sensors.

One aspect includes an image sensor that includes: a pixel array includes pixel array circuitry; a read path includes read path circuitry; and an analog to digital converter (ADC) includes analog to digital converter (ADC) circuitry, where the pixel array includes a number of selectable pixel types includes at least one of the following pixel types: higher sensitivity to electrons pixel types, pixel types implementing electrical shielding, pixel types implementing similar sensitivity to electrons with different sensitivity to photons, and/or pixel types having reduced sensitivity to electrons.

One aspect includes an image sensor that includes: a pixel array includes pixel array circuitry; a read path includes read path circuitry; and an analog to digital converter (ADC) includes analog to digital converter (ADC) circuitry, where the pixel array includes a number of selectable pixel characteristics.

One aspect includes an image sensor that includes: a pixel array includes pixel array circuitry; a read path includes read path circuitry; and a capacitive element and a capacitive enable circuit configured to enable the capacitive element to vary a capacitance provided to a pixel of the pixel array, where the pixel array is configured to selectively implement the capacitive element and the capacitive element enable circuit in different pixels and/or different areas of the pixel array.

One aspect includes an image sensor that includes: a pixel array includes pixel array circuitry; a read path includes read path circuitry; and a temperature sensor.

One aspect includes an image sensor that includes: a pixel array includes pixel array circuitry; a read path includes read path circuitry; and where the pixel array includes a number of selectable pixel types includes at least one of the following pixel types: higher sensitivity to electrons pixel types, pixel types implementing electrical shielding, pixel types implementing similar sensitivity to electrons with different sensitivity to photons, and/or pixel types having reduced sensitivity to electrons.

One aspect includes an image sensor that includes: a pixel array includes pixel array circuitry; a read path includes read path circuitry; and where the pixel array includes a number of selectable pixel characteristics.

In this regard, often a scene content can be predicted. For example, a chest x-ray requires good low noise performance across the chest where many of the x-rays get absorbed by the chest, but requires a high full well capacity around the edges of the image where there is little or no chest material and so a higher x-ray dose. Other times, the scene content can be measured via an initial image acquisition and then the sensor characteristics in each region may be configured to optimize imaging. If the scene content is not known, a suitable mixture of capacitances can be utilized across the sensor such that if one pixel saturates then another nearby pixel will provide relevant information. For example, if the scene content is not known, a suitable mixture of capacitances utilizing a checkerboard implementing high and/or low capacitance, implementation of arbitrary regions having different capacitances, alternate columns implementing high and/or low capacitance, and/or the like can be configured across the sensor such that if one pixel saturates then another nearby pixel will provide relevant information.

In aspects of the disclosure, the image sensor may implement the capacitors to have different capacitances in different pixels, different areas of the sensor, and/or the like. In aspects of the disclosure, the image sensor may implement the pixels to have fixed capacitors of different values permanently connected instead of the capacitors being configurable by the user and/or system.

In aspects of the disclosure, the image sensor may implement a number of selectable pixel types or characteristics rather than being limited to pixel capacitance differences. For example, the image sensor may implement a different amplification level; the image sensor may implement a different bandwidth, which may be a difference in the response of the pixel to x-rays of different energies; the image sensor may be configured to be more or less sensitive to x-ray interaction; the image sensor may be configured to be mainly sensitive to temperature instead of being mainly sensitive to light, which in aspects may only be part of the image sensor that may be configured to be mainly sensitive to temperature instead of being mainly sensitive to light; the image sensor may be configured to have a different sensitivity to x-ray interaction of certain x-ray energies than other pixels; the image sensor may be configured to have a similar sensitivity to electrons with different sensitivity to photons; the image sensor may be configured to have a different response to electrons, protons, and/or other particles absorbed by the pixel; the image sensor may be configured to have a different sensitive area; and/or the image sensor may be configured to have sensitivity to a different range of photon or light wavelengths and/or different sensitivities to wavelengths within that range.

In aspects of the disclosure, the image sensor may be configured to use information related to one or more of the aspects noted to generate an image with more information content than would be possible in an image captured with a single pixel characteristic across the sensor. For example, a high dynamic range image may be generated by combining information from multiple pixels with different characteristics, such as two adjacent pixels with different capacitances or gain levels, into each resultant image pixel.

As another example, the image sensor may be configured such that an image may be generated by comparing nearby pixels, which have different responses to x-ray interaction but similar responses to absorbed electrons, in order to measure an x-ray flux without being influenced by any electrons that the x-rays generate between the source and the sensor.

As another example, the image sensor may be configured with embedded temperature sensors that may be selected on one or more image frames in order to gain additional information on how to correct the rest of the image data. The selection may include one image frame, several image frames, every image frame, and/or the like.

As another example, the image sensor may be configured such that an image may be generated by comparing nearby pixels, which have different responses to x-ray interaction, in order to estimate and correct for an amount by which the image has been affected by x-ray interaction. It should be noted that 'image' does not need to be a visible light image, and image may refer to the array of information gathered by the sensor.

In aspects of the disclosure, the image sensor may be configured for higher dynamic range AND simultaneous low noise performance thanks to the combination of the multiple different pixel capacitances across the sensor. In this regard, normally one excludes the other on, for example, CMOS sensors.

In aspects of the disclosure, the pixel structure may be changed such that some pixels have a different response to photons but a similar response to electrons.

In aspects, the original pixels (with higher sensitivity) can then have suitable electrical shielding added in part of the pixel structure, such as metal shielding or an electrically biased track to attract or repel electrons, which would reduce or increase the original pixels' sensitivity to electrons such that different types of pixels may have different ratios of their response to photons compared to their response to electrons at one or more target photon energies.

Additional features, advantages, and aspects of the disclosure may be set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate aspects of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

DETAILED DESCRIPTION OF THE DISCLOSURE

Figure 1:
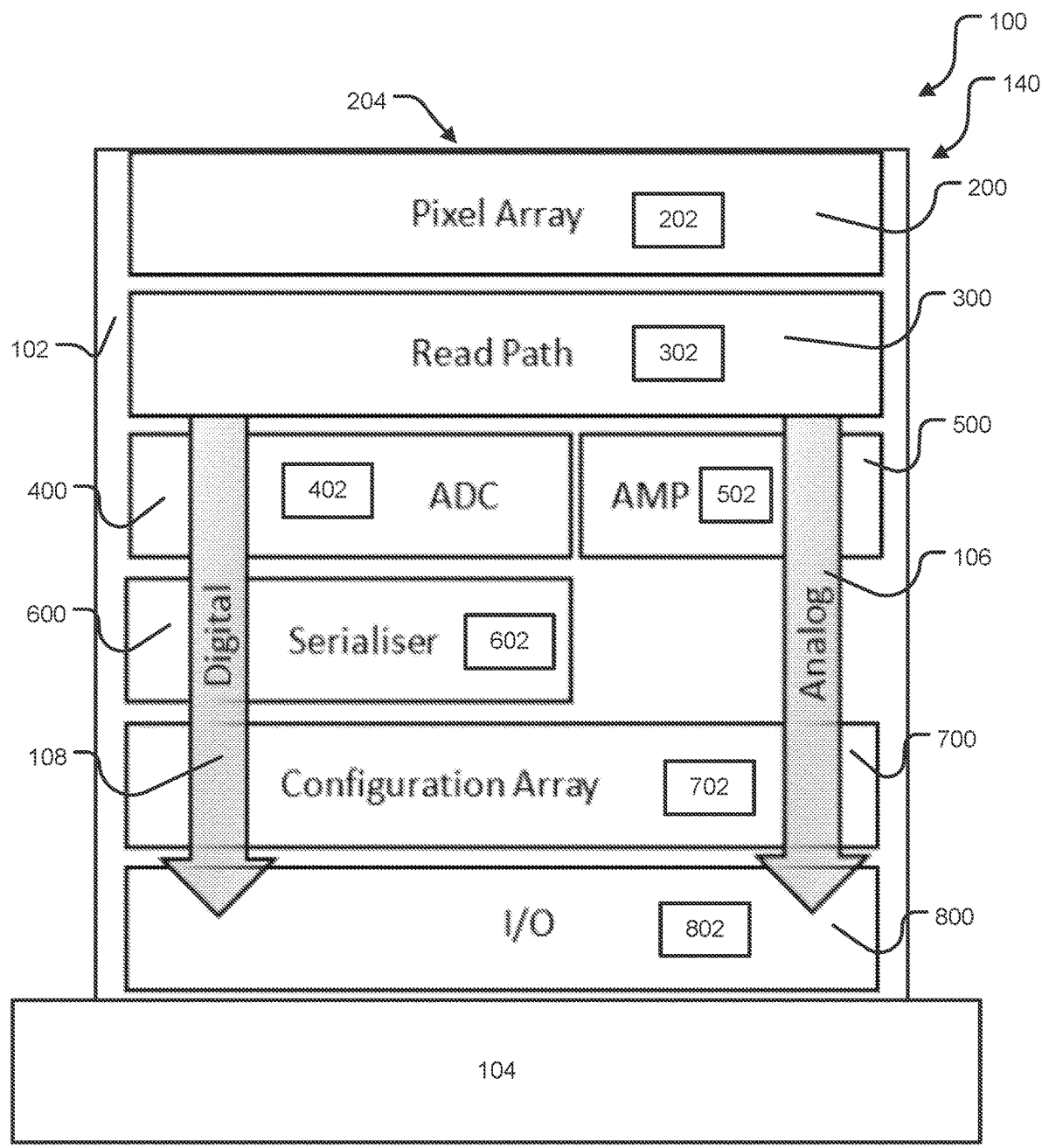
FIG. 1 illustrates a block diagram of an image sensor according to the disclosure.

The aspects of the disclosure and the various features and advantageous details thereof are explained more fully with reference to the non-limiting aspects and examples that are described and/or illustrated in the accompanying drawings and detailed in the following description. It should be noted that the features illustrated in the drawings are not necessarily drawn to scale, and features of one aspect may be employed with other aspects, as the skilled artisan would recognize, even if not explicitly stated herein. Descriptions of well-known components and processing techniques may be omitted so as not to unnecessarily obscure the aspects of the disclosure. The examples used herein are intended merely to facilitate an understanding of ways in which the disclosure may be practiced and to further enable those of skill in the art to practice the aspects of the disclosure. Accordingly, the examples and aspects herein should not be construed as limiting the scope of the disclosure, which is defined solely by the appended claims and applicable law. Moreover, it is noted that like reference numerals represent similar parts throughout the several views of the drawings and in the different embodiments disclosed.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto another element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over another element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to another element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular aspects only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein. In this regard, it should be noted that as used by this disclosure, photons may be visible light photons or higher energy photons, also known as x-rays. Additionally, it should be noted that as used by this disclosure, x-ray interaction may include an x-ray photon interacting with the sensor or sensor substrate.

FIG. 1 illustrates a block diagram of an image sensor according to the disclosure.

As illustrated in FIG. 1, an image sensor 100 may include a pixel array 200 that may be implemented with and/or include pixel array circuitry 202, a read path 300 that may be implemented with and/or include read path circuitry 302, an analog to digital converter (ADC) 400 that may be implemented with and/or include analog to digital converter (ADC) circuitry 402, an amplifier 500 that may be implemented with and/or include amplifier circuitry 502, a serializer 600 that may be implemented with and/or include serializer circuitry 602, a configuration array 700 that may be implemented with and/or include configuration array circuitry 702, an input/output (I/O) 800 that may be implemented with and/or include input/output (I/O) circuitry 802.

In aspects, one or more of the pixel array 200, the pixel array circuitry 202, the read path 300, the read path circuitry 302, the analog to digital converter (ADC) 400, the analog to digital converter (ADC) circuitry 402, the amplifier 500, the amplifier circuitry 502, the serializer 600, the input/output (I/O) 800, the input/output (I/O) circuitry 802, and/or the like may be implemented in a substrate 102. In aspects, the substrate 102 may be a silicon (Si) substrate, a silicon (Si) die, a P type silicon (Si) substrate, and/or the like. Additionally, the image sensor 100 may be implemented as a Complementary Metal-Oxide-Semiconductor (CMOS) image sensor.

Additionally, the various components, functions, and/or descriptions of the pixel array 200, the pixel array circuitry 202, the read path 300, the read path circuitry 302, the analog to digital converter (ADC) 400, the analog to digital converter (ADC) circuitry 402, the amplifier 500, the amplifier circuitry 502, the serializer 600, the input/output (I/O) 800, the input/output (I/O) circuitry 802, and/or the like may be implemented in any one of the above-noted components, may be implemented in more than one of the above-noted components, and/or the like.

The image sensor 100 that may be implemented within the substrate 102 may be mounted onto, connected to, and/or the like a printed circuit board (PCB) assembly 104, another processor, a Field Programmable Gate Array (FPGA), and/or the like. In aspects, the image sensor 100 implemented together with the printed circuit board (PCB) assembly 104 and/or the like may form a module 140. The module 140 may be configured as a self-contained module, an imaging module, a self-contained imaging module, a housing, and/or the like. In aspects, the image sensor 100 may be implemented with and/or responsive to a scintillator. The scintillator may include a material that exhibits scintillation, a property of luminescence, when excited by ionizing radiation. In this regard, when the image sensor 100 is implemented with the scintillator, the image sensor 100 may acquire X-ray image data, computed tomography image data, and/or the like.

As further described below, the image sensor 100 may be implemented by a process of implementing an image sensor. In aspects, the image sensor 100 may be implemented in the substrate 102 and manufactured on a wafer, such as a silicon wafer. In aspects, the image sensor 100 may be implemented in the substrate 102 as a silicon die and manufactured on a wafer. The silicon die may be implemented utilizing any size wafer.

The image sensor 100 may be configured for general purpose imaging applications. In aspects, the image sensor 100 may be configured for general purpose imaging applications including non-destructive testing (NDT) applications, medical imaging and dosimetry applications, and/or the like applications. As further described herein, the image sensor 100 may be configured to generate images that may be captured using high frame rates, with faster frame rates achievable using one or more regions of interest, and/or the like as further described herein.

In aspects, the image sensor 100 may be implemented as a self-contained module, comprising a silicon die mounted onto the printed circuit board (PCB) assembly 104 and/or the like. The image sensor 100 may be configured to be highly flexible, such as for numerous different applications. Moreover, the image sensor 100 may be configured with a feature set that facilitates basic image acquisition through complex acquisition schemes. Additionally, the image sensor 100 may be configured to fulfill the requirements of many different applications.

The pixel array 200 and/or the pixel array circuitry 202 may receive stimulus from the digital logic. Additionally, the pixel array 200 may receive incident light as part of the imaging process. The image sensor 100 may be configured such that a pixel voltage response to that stimulus and incident light received by the pixel array 200 may be captured as an analog voltage by the read path 300 and/or the read path circuitry 302.

The image sensor 100 may be configured such that the analog voltages are converted to a digital form by the analog to digital converter (ADC) 400 and/or the analog to digital converter (ADC) circuitry 402 to generate digital signals illustrated as a digital read path 108 in FIG. 1.

Additionally, the image sensor 100 may be configured such that the pixel responses may also be accessible in their undigitized form. In this regard, the image sensor 100 may be configured such that the analog voltages are amplified by the amplifier 500 and/or the amplifier circuitry 502 to generate amplified analog signals illustrated as an analog read path 106 in FIG. 1.

In aspects, the image sensor 100 and/or the pixel array 200 may be configured for implementation with thermal sensing pixels, thermal sensing components, and/or the like. In aspects, the image sensor 100 and/or the pixel array 200 may be configured for implementation for low full-well modes and/or high full-well modes. In aspects, the image sensor 100 and/or the pixel array 200 may be configured for implementation for low full-well modes and high full-well modes. In aspects, the image sensor 100 and/or the pixel array 200 may be configured for implementation for column selectable low full-well modes and/or column selectable high full-well modes. In aspects, the image sensor 100 and/or the pixel array 200 may be configured for implementation for column selectable low full-well modes and column selectable high full-well modes.

Figure 2:
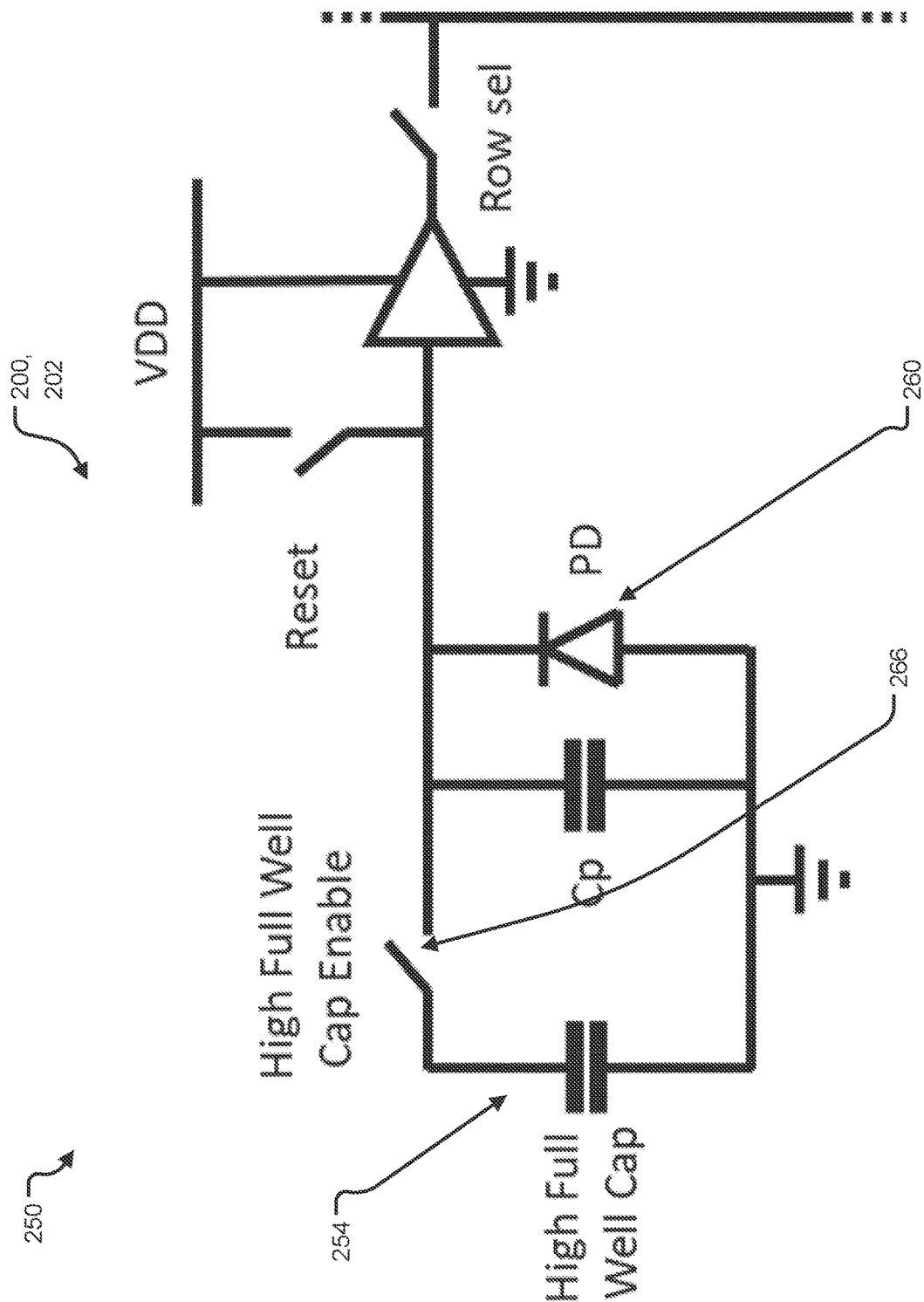
FIG. 2 illustrates an exemplary implementation of a pixel of a pixel array of the image sensor according to aspects of the disclosure.

FIG. 2 illustrates an exemplary implementation of a pixel of a pixel array of the image sensor according to aspects of the disclosure.

In particular, FIG. 2 illustrates an exemplary implementation of a pixel 250 of the array of pixels 204 that may be implemented by the pixel array 200 of the image sensor 100. Aspects of the pixel 250 may be implemented in the image sensor 100, the pixel array 200, and/or the pixel array circuitry 202.

Additionally, the pixel 250 may be implemented with a capacitive element 254. In aspects, the capacitive element may be implemented by a switched high dynamic range (HDR) capacitive element. The pixel 250 may implement a photodiode 260 as the light reactive element. In aspects, the photodiode 260 may be a Pinned Photo Diode (PPD).

The photodiode 260 may have one node connected to ground and another node connected to the capacitive element 254. In aspects, the image sensor 100 may implement the pixel array 200 with a number of selectable pixel types or characteristics. In aspects, the image sensor 100 may implement the pixel array 200 with a number of pixel types or characteristics. In this regard, the pixel array 200 may implement a plurality of implementations of the pixel 250 with different pixel types that may be configured to be selectable and/or may be configured without any selectability.

In this aspect, the image sensor 100 may be configured to select which different pixel types of the pixel array 200 are implemented to provide the desired readings for the image sensor 100. Additionally, the pixel array 200 may implement a plurality of implementations of the pixel 250 with different characteristics. In this aspect, the image sensor 100 may be configured to select which different characteristics of the pixel array 200 are implemented to provide the desired readings for the image sensor 100. Furthermore, the pixel array 200 may implement a plurality of implementations of the pixel 250 with different characteristics and different pixel types. In this aspect, the image sensor 100 may be configured to select which different characteristics and different pixel types of the pixel array 200 are implemented to provide the desired readings for the image sensor 100.

Additionally, it is noted that photons and electrons have different absorption depths in the silicon of the image sensor 100. This means that the photodiode structure of the pixel 250 in the pixels themselves may be changed such that some pixels have a reduced response to the same photon flux. These pixels may also give a smaller response to electrons. Accordingly, the pixel array 200 may be implemented such that some implementations of the pixel 250 may have a first response to photon flux and some implementations of the pixel 250 may have a second response to photon flux. In further aspects, the pixel array 200 may be implemented such that implementations of the pixel 250 may have n different responses to photon flux.

In aspects, the pixel 250 or original pixels may be implemented with higher sensitivity. Additionally, other implementations of the pixel 250 or original pixels may have suitable electrical shielding added in part of the pixel structure, such as metal shielding, an electrically biased structure to attract or repel electrons, and/or the like. This modification to the pixel 250 may reduce or increase the original pixels' sensitivity to electrons such that different types of pixels have different ratios of their response to photons compared to their response to electrons at one or more target photon energies.

In aspects, implementation of the image sensor 100, the pixel array 200, and/or multiple implementations of the pixel 250 utilizing variety of pixel types may be an advantage, such as a wider dynamic range after both are combined.

In particular aspects, there may be a plurality of implementations of the capacitive element 254. Additionally, the photodiode 260 may include a capacitor Cp connected in parallel. Between the photodiode 260 and the capacitive element 254 may be a capacitive element enable circuit 266. In aspects, the capacitive element enable circuit 266 may be implemented as a high dynamic range (HDR) capacitor enable circuit. In this regard, the full-well capacity may be the largest charge a pixel can hold before saturation, which results in degradation of the signal. Greater well capacity may offer higher dynamic range, which may be beneficial for some applications. Accordingly, various components of the image sensor 100 may be implemented with higher dynamic range to support the full-well capacity of the pixel. The capacitive element enable circuit 266 may connect the capacitive element 254 to the photodiode 260. In particular aspects, there may be a plurality of implementations of the a capacitive element enable circuit 266; and a plurality of implementations of the capacitive element 254. Accordingly, the pixel array 200, and/or the pixel array circuitry 202 may be configured to provide many different levels of capacitance as needed and/or desired based on which implementations of the capacitive element 254 are enabled by the plurality of implementations of the capacitive element enable circuit 266. In aspects, the capacitive element 254 and/or the capacitive element enable circuit 266 may be implemented as a metal-oxide-semiconductor field-effect transistors (MOSFET).

Figure 3:
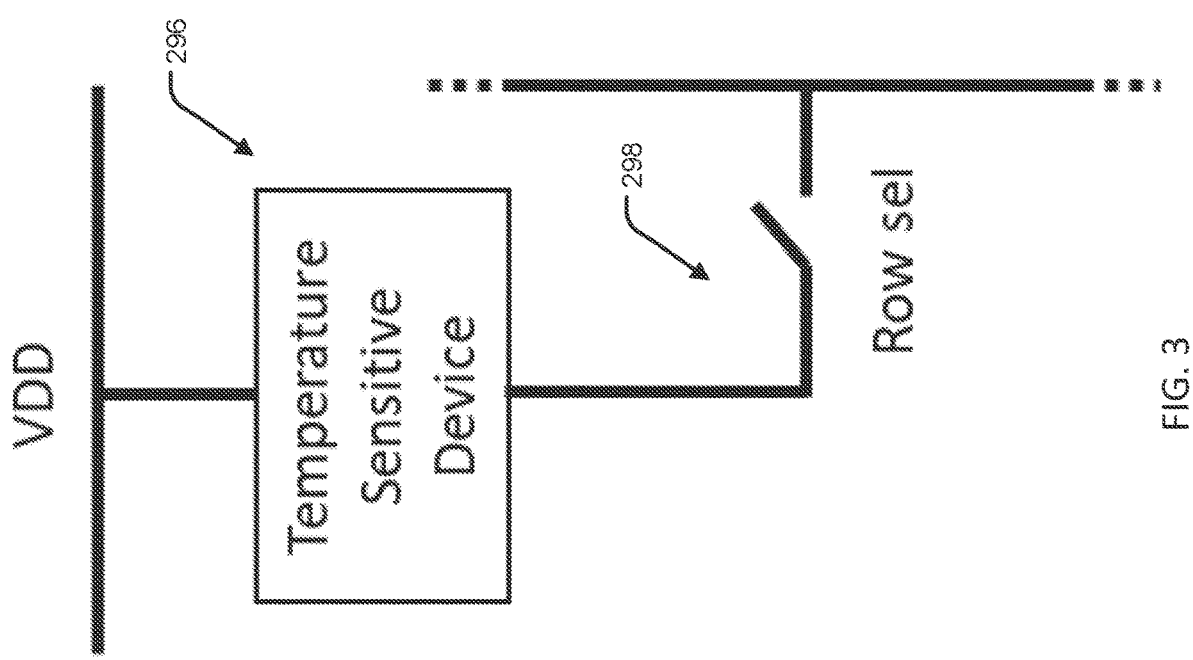
FIG. 3 illustrates a temperature sensor and associated circuitry according to aspects of the disclosure.

FIG. 3 illustrates a temperature sensor and associated circuitry according to aspects of the disclosure.

In particular, FIG. 3 illustrates a temperature sensor 296 and associated circuitry 298. In aspects, the temperature sensor 296 may be implemented as a transistor, a diode and/or the like. Additionally, the temperature sensor 296 may provide absolute temperature information.

In aspects, there may be one implementation of the temperature sensor 296 and/or the associated circuitry 298 per column, at the base of the column. A second type implementation of the temperature sensor 296 may be a customized pixel referred to as a thermometer pixel. In aspects, the thermometer pixel may be located within a special pixel, with one or more per image sensor. In aspects, the special pixel may be located in the center of the pixel array 200 or a number of them distributed across the image sensor. Other locations in the pixel array 200 are contemplated as well.

In aspects, the temperature sensor 296 may connect to the existing columns line and when addressed, may produce an output voltage proportional to temperature, generally proportional to temperature, and/or as a function of temperature.

With reference back to FIG. 2, the image sensor 100, the pixel array 200, the pixel array circuitry 202, and/or the like may be configured to vary a capacitance provided to the pixel 250 through implementation of the capacitive element 254 and the capacitive element enable circuit 266. In aspects, the image sensor 100, the pixel array 200, the pixel array circuitry 202, and/or the like may be configured to vary a capacitance provided to each of the plurality of implementations of the pixel 250 equally, unequally, and/or the like.

In this regard, often a scene content can be predicted. For example, a chest x-ray requires good low noise performance across the chest where many of the x-rays get absorbed by the chest, but requires a high full well capacity around the edges of the image where there is little or no chest material and so a higher x-ray dose. Other times, the scene content can be measured via an initial image acquisition and then the characteristics of the image sensor 100 in each region may be configured to optimize imaging. If the scene content is not known, a suitable mixture of capacitances can be utilized across the image sensor 100 utilizing the capacitive element 254 and/or the capacitive element enable circuit 266 such that if one implementation of the pixels 250 of the pixel array 200 saturates then another nearby implementation of the pixels 250 of the pixel array 200 may provide relevant information. For example, if the scene content is not known, a suitable mixture of capacitances utilizing the capacitive element 254 and/or the capacitive element enable circuit 266 utilizing a checkerboard implementing high and/or low capacitance, implementation of arbitrary regions having different capacitances, alternate columns implementing high and/or low capacitance, and/or the like can be configured across the image sensor 100 such that if one implementation of the pixels 250 of the image sensor 100 saturates then another nearby implementation of the pixels 250 of the image sensor 100 may provide relevant information such that if one implementation of the pixels 250 of the image sensor 100 saturates then another nearby implementation of the pixels 250 may provide relevant information to the image sensor 100.

In aspects of the disclosure, the image sensor 100 may implement the capacitors to have different capacitances utilizing the capacitive element 254 and/or the capacitive element enable circuit 266 in different pixels, different areas of the image sensor 100, the pixel array 200, and/or the like. In aspects of the disclosure, the image sensor 100 may implement the pixels 250 to have fixed capacitors of different values permanently connected instead of the capacitors being configurable by the user and/or system.

In aspects of the disclosure, the image sensor 100 may implement a number of selectable pixel types or characteristics rather than being limited to pixel capacitance differences. For example, the image sensor 100 may implement a different amplification level; the image sensor 100 may implement a different bandwidth; the image sensor 100 may be configured to be more or less sensitive to x-ray interaction; the image sensor 100 may be configured to be mainly sensitive to temperature instead of being mainly sensitive to light; the image sensor 100 may be configured to have a different sensitivity to x-ray interaction of certain x-ray energies than other pixels; the image sensor 100 may be configured to have a different response to electrons, protons, and/or other particles absorbed by the pixel; the image sensor 100 may be configured to have a different sensitive area; the image sensor may be configured to have a similar sensitivity to electrons with different sensitivity to photons; and/or the image sensor 100 may be configured to have sensitivity to a different range of photon or light wavelengths and/or different sensitivities to wavelengths within that range.

In aspects of the disclosure, the image sensor 100 may be configured to use information related to one or more of the aspects noted above to generate an image with more information content than would be possible in an image captured with the pixel 250 implemented with a single pixel characteristic across the image sensor 100. For example, a high dynamic range image may be generated by combining information from the pixel array 200 implementing multiple pixels with different characteristics, such as two adjacent pixels with different capacitances or gain levels, into each resultant image pixel.

As another example, the image sensor 100 may be configured such that an image may be generated by comparing nearby pixels, which have different responses to x-ray interaction but similar responses to absorbed electrons, in order to measure an x-ray flux without being influenced by any electrons that the x-rays generate between the source and the image sensor 100. Additionally, the image sensor 100 may be configured to measure the x-ray interaction independently of the electron flux by comparing the response from two pixels with a different ratio of electron response to photon response. Moreover, the image sensor 100 may be configured to implement a method of measuring the x-ray interaction independently of the electron flux by comparing the response from two pixels with a different ratio of electron response to photon response.

As another example, the image sensor 100 may be configured with embedded temperature sensors, such as the temperature sensor 296 illustrated in FIG. 3, that may be selected on one or more image frames in order to gain additional information on how to correct the rest of the image data. The selection may include one image frame, several image frames, every image frame, and/or the like. In particular aspects, the selection may be controlled by the image sensor 100, the printed circuit board (PCB) assembly 104, and/or the like.

As another example, the image sensor 100 may be configured such that an image may be generated by comparing nearby pixels, which have different responses to x-ray interaction, in order to estimate and correct for an amount by which the image has been affected by x-ray interaction. In particular aspects, the comparison may be controlled by the image sensor 100, the printed circuit board (PCB) assembly 104, and/or the like. It should be noted that 'image' does not need to be a visible light image, and image may refer to the array of information gathered by the sensor.

In aspects of the disclosure, the image sensor 100 may be configured for higher dynamic range AND simultaneous low noise performance thanks to the combination of the alternate column Full Well modes and high frame rate. In aspects, the image sensor 100 may be configured to implement alternate column Full Well modes and high frame rate by implementation of the pixel array 200, the pixel array circuitry 202, and/or the like. In this regard, normally one excludes the other on, for example, CMOS sensors.

The above described implementation of the image sensor 100 may provide higher dynamic range AND simultaneous low noise performance based on the combination of the alternate column Full Well modes AND high frame rate. Normally, one excludes the other on CMOS sensors.

Moreover, the above described implementation of the image sensor 100 may implement thermo-pixels to offer unique correction performance in non-optimal working environments where temperatures are subject to change, for example in portable applications. In this regard, the image sensor 100 may be implemented with a temperature sensitive device wired as a diode, accessible via a bond pad, which gives absolute temperature information. Additionally, the image sensor 100 may be implemented with a thermo-pixel configuration, which may provide a voltage that is read out concurrently and in identical manner to light sensitive pixels. The configuration of the image sensor 100 as such ensures that surrounding pixels will behave agnostically of the thermal pixels, which maintains the photodiode within it (reset, but with the read out path replaced by the thermo pixel device). Additionally, the image sensor 100 may be configured with thermal pixels that may be distributed across the pixel array 200 to provide a spatial map of a temperature of the image sensor 100.

The disclosure further includes a process of implementing an image sensor. It should be noted that the aspects of the process of implementing an image sensor may be performed in a different order consistent with the aspects described herein. Additionally, it should be noted that portions of the process of implementing an image sensor may be performed in a different order consistent with the aspects described herein. Moreover, the process of implementing an image sensor may be modified to have more or fewer processes consistent with the various aspects disclosed herein. Additionally, the process of implementing an image sensor may include any other aspects of the disclosure described herein.

Initially, the process of implementing an image sensor may include utilizing one or more manufacturing techniques for forming the image sensor 100. In particular, the process of implementing an image sensor may include utilizing one or more CMOS manufacturing techniques for forming the image sensor 100.

In particular, the process of implementing an image sensor may include utilizing one or more manufacturing techniques for forming the pixel array 200, the pixel array circuitry 202, the read path 300, the read path circuitry 302, the analog to digital converter (ADC) 400, the analog to digital converter (ADC) circuitry 402, the amplifier 500, the amplifier circuitry 502, the serializer 600, the input/output (I/O) 800, the input/output (I/O) circuitry 802, and/or the like. The one or more manufacturing techniques may include growing field oxide, etching oxide for pMOSFET portions, diffusing n-well portions, growing gate oxide, depositing polysilicon, etching polysilicon and oxide, implanting portions such as sources and drains, growing nitride, etching nitride, depositing metal, etching metal, and/or the like.

Additionally, other manufacturing techniques may include print screening for solder paste, print screening for epoxy, silk screen printing processes, photoengraving processes, print onto transparent film processes, photo mask processes in combination with etching processes, photosensitized board processes, laser resist ablation processes, milling processes, laser etching processes, direct metal printing processes, and/or like processes.

Additionally, the process of implementing an image sensor may include cutting the panel and/or the wafer utilizing cutting equipment such as wafer, circuit board, or package sawing equipment to singulate the image sensor 100 from the panel or the wafer, which may have the advantage that the image sensor 100 may be arranged on dicing tape on a ring frame, which can be directly loaded to the Die Attach equipment for subsequent assembly onto the printed circuit board (PCB) assembly 104.

Additionally, the process of implementing an image sensor may include forming connections to the various components of the image sensor 100 with an adhesive, soldering, sintering, eutectic bonding, ultrasonically welding, and/or the like as described herein.

The following are a number of nonlimiting EXAMPLES of aspects of the disclosure. One EXAMPLE includes: EXAMPLE 1. An image sensor includes: a pixel array includes pixel array circuitry; a read path includes read path circuitry; and a capacitive element and a capacitive enable circuit configured to enable the capacitive element to vary a capacitance provided to a pixel of the pixel array, where the pixel array is configured to selectively implement the capacitive element and the capacitive element enable circuit in different pixels and/or different areas of the pixel array.

The above-noted EXAMPLE may further include any one or a combination of more than one of the following EXAMPLES: 2. The image sensor according to any EXAMPLE herein where the pixel array is configured to vary a capacitance provided to pixel of the pixel array utilizing one of the following implementations: a checkerboard implementation implementing high and/or low capacitance, implementation of arbitrary regions having different capacitances, and an alternate column implementation implementing high and/or low capacitance. 3. The image sensor according to any EXAMPLE herein where the pixel array includes a number of selectable pixel types includes at least one of the following pixel types: higher sensitivity to electrons pixel types, pixel types implementing electrical shielding, pixel types implementing similar sensitivity to electrons with different sensitivity to photons, and/or pixel types having reduced sensitivity to electrons. 4. The image sensor according to any EXAMPLE herein where the pixel array includes a number of selectable pixel characteristics. 5. The image sensor according to claim 4 where the selectable pixel characteristics includes at least one of the following: a different amplification level, a different bandwidth, a different sensitivity to temperature, a different sensitivity to x-ray interaction, a different response to electrons, a different response to protons, a different range of photon wavelengths, and/or different sensitivities to wavelengths within a range. 6. The image sensor according to any EXAMPLE herein includes a temperature sensor, where the temperature sensor includes a thermometer pixel.

One EXAMPLE includes: EXAMPLE 7. An image sensor includes: a pixel array includes pixel array circuitry; a read path includes read path circuitry; and a temperature sensor.

The above-noted EXAMPLE may further include any one or a combination of more than one of the following EXAMPLES: 8. The image sensor according to any EXAMPLE herein where the temperature sensor is implemented as a transistor. 9. The image sensor according to any EXAMPLE herein where the temperature sensor includes a thermometer pixel. 10. The image sensor according to any EXAMPLE herein includes: a capacitive element and a capacitive enable circuit configured to enable the capacitive element to vary a capacitance provided to a pixel of the pixel array. 11. The image sensor according to any EXAMPLE herein where the capacitive element enable circuit is configured to connect the capacitive element to a photodiode of the pixel array. 12. The image sensor according to any EXAMPLE herein where the pixel array is configured to selectively implement the capacitive element and the capacitive element enable circuit in different pixels and/or different areas of the pixel array. 13. The image sensor according to any EXAMPLE herein where the pixel array is configured to vary a capacitance provided to pixel of the pixel array utilizing one of the following implementations: a checkerboard implementation implementing high and/or low capacitance, implementation of arbitrary regions having different capacitances, and an alternate column implementation implementing high and/or low capacitance. 14. The image sensor according to any EXAMPLE herein where the pixel array includes a number of selectable pixel types includes at least one of the following pixel types: higher sensitivity to electrons pixel types, pixel types implementing electrical shielding, pixel types implementing similar sensitivity to electrons with different sensitivity to photons, and/or pixel types having reduced sensitivity to electrons. 15. The image sensor according to any EXAMPLE herein where the pixel array includes a number of selectable pixel characteristics. 16. The image sensor according to any EXAMPLE herein where the selectable pixel characteristics includes at least one of the following: a different amplification level, a different bandwidth, a different sensitivity to temperature, a different sensitivity to x-ray interaction, a different response to electrons, a different response to protons, a different range of photon wavelengths, and/or different sensitivities to wavelengths within a range.

One EXAMPLE includes: EXAMPLE 17. An image sensor includes: a pixel array includes pixel array circuitry; and a read path includes read path circuitry, where the pixel array includes a number of pixel types includes at least one of the following pixel types: higher sensitivity to electrons pixel types, pixel types implementing electrical shielding, pixel types implementing different ratios of electron and photon sensitivities, and/or pixel types having reduced sensitivity to electrons.

The above-noted EXAMPLE may further include any one or a combination of more than one of the following EXAMPLES: 18. The image sensor according to any EXAMPLE herein where the pixel array is configured to measure an x-ray independently of an electron flux by comparing a response from two pixels with a different ratio of electron response to photon response. 19. The image sensor according to any EXAMPLE herein includes a temperature sensor, where the temperature sensor includes a thermometer pixel. 20. The image sensor according to any EXAMPLE herein includes: a capacitive element and a capacitive enable circuit configured to enable the capacitive element to vary a capacitance provided to a pixel of the pixel array. 21. The image sensor according to claim 20 where the capacitive element enable circuit is configured to connect the capacitive element to a photodiode of the pixel array. 22. The image sensor according to claim 20 where the pixel array is configured to selectively implement the capacitive element and the capacitive element enable circuit in different pixels and/or different areas of the pixel array. 23. The image sensor according to claim 20 where the pixel array is configured to vary a capacitance provided to pixel of the pixel array utilizing one of the following implementations: a checkerboard implementation implementing high and/or low capacitance, implementation of arbitrary regions having different capacitances, and an alternate column implementation implementing high and/or low capacitance. 24. The image sensor according to any EXAMPLE herein where the pixel array includes a number of selectable pixel characteristics. 25. The image sensor according to claim 24 where the selectable pixel characteristics includes at least one of the following: a different amplification level, a different bandwidth, a different sensitivity to temperature, a different sensitivity to x-ray interaction, a different response to electrons, a different response to protons, a different range of photon wavelengths, and/or different sensitivities to wavelengths within a range.

One EXAMPLE includes: EXAMPLE 26. An image sensor includes: a pixel array includes pixel array circuitry; a read path includes read path circuitry; and where the pixel array includes a number of selectable pixel characteristics.

The above-noted EXAMPLE may further include any one or a combination of more than one of the following EXAMPLES: 27. The image sensor according to any EXAMPLE herein where the selectable pixel characteristics includes at least one of the following: a different amplification level, a different bandwidth, a different sensitivity to temperature, a different sensitivity to x-ray interaction, a different response to electrons, a different response to protons, a different range of photon wavelengths, and/or different sensitivities to wavelengths within a range. 28. The image sensor according to any EXAMPLE herein where the pixel array includes a number of selectable pixel types includes at least one of the following pixel types: higher sensitivity to electrons pixel types, pixel types implementing electrical shielding, pixel types implementing similar sensitivity to electrons with different sensitivity to photons, and/or pixel types having reduced sensitivity to electrons. 29. The image sensor according to any EXAMPLE herein includes a temperature sensor, where the temperature sensor includes a thermometer pixel. 30. The image sensor according to any EXAMPLE herein includes: a capacitive element and a capacitive enable circuit configured to enable the capacitive element to vary a capacitance provided to a pixel of the pixel array. 31. The image sensor according to claim 30 where the capacitive element enable circuit is configured to connect the capacitive element to a photodiode of the pixel array. 32. The image sensor according to claim 30 where the pixel array is configured to selectively implement the capacitive element and the capacitive element enable circuit in different pixels and/or different areas of the pixel array. 33. The image sensor according to claim 30 where the pixel array is configured to vary a capacitance provided to pixel of the pixel array utilizing one of the following implementations: a checkerboard implementation implementing high and/or low capacitance, implementation of arbitrary regions having different capacitances, and an alternate column implementation implementing high and/or low capacitance.

The adhesive of the disclosure may be utilized in an adhesive bonding process that may include applying an intermediate layer to connect surfaces to be connected. The adhesive may be organic or inorganic; and the adhesive may be deposited on one or both surfaces of the surface to be connected. The adhesive may be utilized in an adhesive bonding process that may include applying adhesive material with a particular coating thickness, at a particular bonding temperature, for a particular processing time while in an environment that may include applying a particular tool pressure. In one aspect, the adhesive may be a conductive adhesive, an epoxy-based adhesive, a conductive epoxy-based adhesive, and/or the like.

The solder of the disclosure may be utilized to form a solder interface that may include solder and/or be formed from solder. The solder may be any fusible metal alloy that may be used to form a bond between surfaces to be connected. The solder may be a lead-free solder, a lead solder, a eutectic solder, or the like. The lead-free solder may contain tin, copper, silver, bismuth, indium, zinc, antimony, traces of other metals, and/or the like. The lead solder may contain lead, other metals such as tin, silver, and/or the like. The solder may further include flux as needed.

The sintering of the disclosure may utilize a process of compacting and forming a conductive mass of material by heat and/or pressure. The sintering process may operate without melting the material to the point of liquefaction. The sintering process may include sintering of metallic nano or hybrid powders in pastes or epoxies. The sintering process may include sintering in a vacuum. The sintering process may include sintering with the use of a protective gas.

The eutectic bonding of the disclosure may utilize a eutectic soldering process that may form a eutectic system. The eutectic system may be used between surfaces to be connected. The eutectic bonding may utilize metals that may be alloys and/or intermetallics that transition from solid to liquid state, or from liquid to solid state, at a specific composition and temperature. The eutectic alloys may be deposited by sputtering, evaporation, electroplating, and/or the like.

The ultrasonically welding of the disclosure may utilize a process whereby high-frequency ultrasonic acoustic vibrations are locally applied to components being held together under pressure. The ultrasonically welding may create a solid-state weld between surfaces to be connected. In one aspect, the ultrasonically welding may include applying a sonicated force.

The many features and advantages of the disclosure are apparent from the detailed specification, and, thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. An image sensor comprising:
   a pixel array comprising pixel array circuitry;
   a read path comprising read path circuitry; and
   a capacitive element and a capacitive enable circuit configured to enable the capacitive element to vary a capacitance provided to a pixel of the pixel array,
   wherein the pixel array is configured to selectively implement the capacitive element and the capacitive element enable circuit in different pixels and/or different areas of the pixel array; and
   wherein the pixel array comprises a number of selectable pixel types comprising at least one of the following pixel types: higher sensitivity to electrons pixel types, pixel types implementing electrical shielding, pixel types implementing similar sensitivity to electrons with different sensitivity to photons, and/or pixel types having reduced sensitivity to electrons.

2. The image sensor according to claim 1 wherein the pixel array is configured to vary a capacitance provided to pixel of the pixel array utilizing one of the following implementations: a checkerboard implementation implementing high and/or low capacitance, implementation of arbitrary regions having different capacitances, and an alternate column implementation implementing high and/or low capacitance.

3. The image sensor according to claim 1 wherein the pixel array comprises a number of selectable pixel characteristics.

4. The image sensor according to claim 1 further comprising a temperature sensor,
   wherein the temperature sensor comprises a thermometer pixel.

5. An image sensor comprising:
   a pixel array comprising pixel array circuitry;
   a read path comprising read path circuitry; and
   a capacitive element and a capacitive enable circuit configured to enable the capacitive element to vary a capacitance provided to a pixel of the pixel array, wherein the pixel array is configured to selectively implement the capacitive element and the capacitive element enable circuit in different pixels and/or different areas of the pixel array;

wherein the pixel array comprises a number of selectable pixel characteristics; and wherein the selectable pixel characteristics comprise at least one of the following: a different amplification level, a different bandwidth, a different sensitivity to temperature, a different sensitivity to x-ray interaction, a different response to electrons, a different response to protons, a different range of photon wavelengths, and/or different sensitivities to wavelengths within a range.

6. The image sensor according to claim 5 wherein the pixel array comprises a number of selectable pixel types comprising at least one of the following pixel types: higher sensitivity to electrons pixel types, pixel types implementing electrical shielding, pixel types implementing similar sensitivity to electrons with different sensitivity to photons, and/or pixel types having reduced sensitivity to electrons.

7. An image sensor comprising:
a pixel array comprising pixel array circuitry;
a read path comprising read path circuitry; and
a temperature sensor,
wherein the temperature sensor is implemented as a transistor.

8. The image sensor according to claim 7 wherein the temperature sensor comprises a thermometer pixel.

9. The image sensor according to claim 7 further comprising:
a capacitive element and a capacitive enable circuit configured to enable the capacitive element to vary a capacitance provided to a pixel of the pixel array.

10. The image sensor according to claim 9 wherein the capacitive element enable circuit is configured to connect the capacitive element to a photodiode of the pixel array.

11. The image sensor according to claim 9 wherein the pixel array is configured to selectively implement the capacitive element and the capacitive element enable circuit in different pixels and/or different areas of the pixel array.

12. The image sensor according to claim 9 wherein the pixel array is configured to vary a capacitance provided to pixel of the pixel array utilizing one of the following implementations: a checkerboard implementation implementing high and/or low capacitance, implementation of arbitrary regions having different capacitances, and an alternate column implementation implementing high and/or low capacitance.

13. The image sensor according to claim 7 wherein the pixel array comprises a number of selectable pixel characteristics.

14. An image sensor comprising:
a pixel array comprising pixel array circuitry;
a read path comprising read path circuitry; and
a temperature sensor,
wherein the pixel array comprises a number of selectable pixel types comprising at least one of the following pixel types: higher sensitivity to electrons pixel types, pixel types implementing electrical shielding, pixel types implementing similar sensitivity to electrons with different sensitivity to photons, and/or pixel types having reduced sensitivity to electrons.

15. The image sensor according to claim 14 wherein the temperature sensor is implemented as a transistor.

16. An image sensor comprising:
a pixel array comprising pixel array circuitry;
a read path comprising read path circuitry; and
a temperature sensor,
wherein the pixel array comprises a number of selectable pixel characteristics; and
wherein the selectable pixel characteristics comprise at least one of the following: a different amplification level, a different bandwidth, a different sensitivity to temperature, a different sensitivity to x-ray interaction, a different response to electrons, a different response to protons, a different range of photon wavelengths, and/or different sensitivities to wavelengths within a range.

17. An image sensor comprising:
a pixel array comprising pixel array circuitry; and
a read path comprising read path circuitry,
wherein the pixel array comprises a number of pixel types comprising at least one of the following pixel types: higher sensitivity to electrons pixel types, pixel types implementing electrical shielding, pixel types implementing different ratios of electron and photon sensitivities, and/or pixel types having reduced sensitivity to electrons.

18. The image sensor according to claim 17 wherein the pixel array is configured to measure an x-ray independently of an electron flux by comparing a response from two pixels with a different ratio of electron response to photon response.

19. The image sensor according to claim 17 further comprising a temperature sensor,
wherein the temperature sensor comprises a thermometer pixel.

20. The image sensor according to claim 17 further comprising:
a capacitive element and a capacitive enable circuit configured to enable the capacitive element to vary a capacitance provided to a pixel of the pixel array.

21. The image sensor according to claim 20 wherein the capacitive element enable circuit is configured to connect the capacitive element to a photodiode of the pixel array.

22. The image sensor according to claim 20 wherein the pixel array is configured to selectively implement the capacitive element and the capacitive element enable circuit in different pixels and/or different areas of the pixel array.

23. The image sensor according to claim 20 wherein the pixel array is configured to vary a capacitance provided to pixel of the pixel array utilizing one of the following implementations: a checkerboard implementation implementing high and/or low capacitance, implementation of arbitrary regions having different capacitances, and an alternate column implementation implementing high and/or low capacitance.

24. The image sensor according to claim 17 wherein the pixel array comprises a number of selectable pixel characteristics.

25. The image sensor according to claim 24 wherein the selectable pixel characteristics comprise at least one of the following: a different amplification level, a different bandwidth, a different sensitivity to temperature, a different sensitivity to x-ray interaction, a different response to electrons, a different response to protons, a different range of photon wavelengths, and/or different sensitivities to wavelengths within a range.

26. An image sensor comprising:
a pixel array comprising pixel array circuitry;
a read path comprising read path circuitry; and
wherein the pixel array comprises a number of selectable pixel characteristics; and
wherein the selectable pixel characteristics comprise at least one of the following: a different amplification level, a different bandwidth, a different sensitivity to temperature, a different sensitivity to x-ray interaction, a different response to electrons, a different response to protons, a different range of photon wavelengths, and/or different sensitivities to wavelengths within a range.

27. The image sensor according to claim 26 further comprising a temperature sensor,
wherein the temperature sensor comprises a thermometer pixel.

28. The image sensor according to claim 26 further comprising:
a capacitive element and a capacitive enable circuit configured to enable the capacitive element to vary a capacitance provided to a pixel of the pixel array.

29. The image sensor according to claim 28 wherein the capacitive element enable circuit is configured to connect the capacitive element to a photodiode of the pixel array.

30. The image sensor according to claim 28 wherein the pixel array is configured to selectively implement the capacitive element and the capacitive element enable circuit in different pixels and/or different areas of the pixel array.

31. The image sensor according to claim 28 wherein the pixel array is configured to vary a capacitance provided to pixel of the pixel array utilizing one of the following implementations: a checkerboard implementation implementing high and/or low capacitance, implementation of arbitrary regions having different capacitances, and an alternate column implementation implementing high and/or low capacitance.

32. An image sensor comprising:
a pixel array comprising pixel array circuitry;
a read path comprising read path circuitry; and
wherein the pixel array comprises a number of selectable pixel characteristics; and
wherein the pixel array comprises a number of selectable pixel types comprising at least one of the following pixel types: higher sensitivity to electrons pixel types, pixel types implementing electrical shielding, pixel types implementing similar sensitivity to electrons with different sensitivity to photons, and/or pixel types having reduced sensitivity to electrons.

33. The image sensor according to claim 32
wherein the selectable pixel characteristics comprise at least one of the following: a different amplification level, a different bandwidth, a different sensitivity to temperature, a different sensitivity to x-ray interaction, a different response to electrons, a different response to protons, a different range of photon wavelengths, and/or different sensitivities to wavelengths within a range.

* * * * *